J. GRAMZA.
WIRE CUTTING DEVICE.
APPLICATION FILED MAY 16, 1918.

1,289,159.

Patented Dec. 31, 1918.
2 SHEETS—SHEET 1.

Inventor
J. Gramza

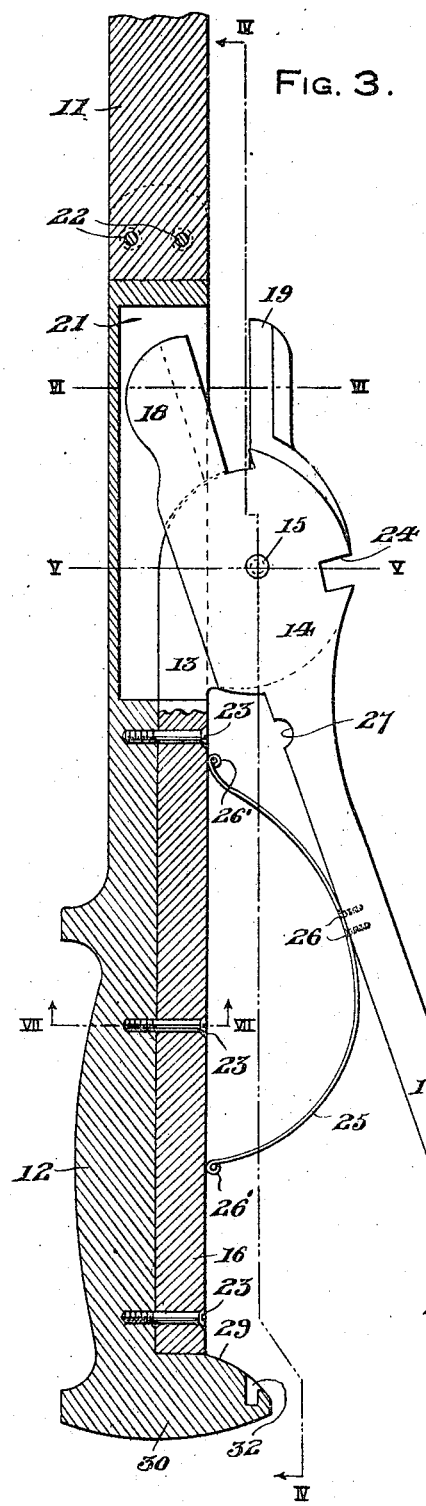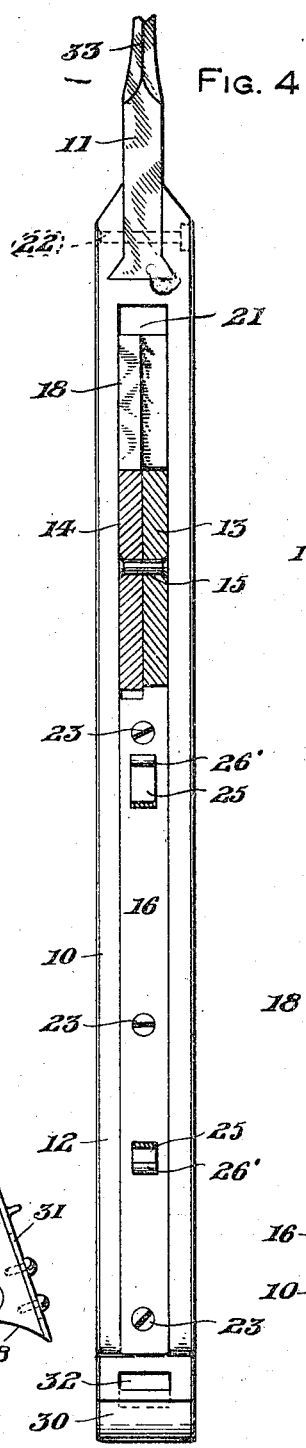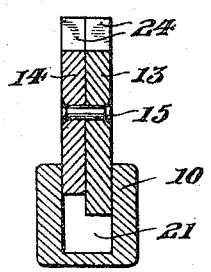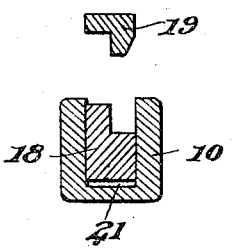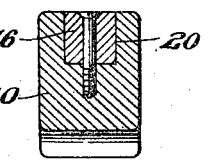

UNITED STATES PATENT OFFICE.

JOSEPH GRAMZA, OF DUNKIRK, NEW YORK.

WIRE-CUTTING DEVICE.

1,289,159.

Specification of Letters Patent.

Patented Dec. 31, 1918.

Application filed May 16, 1918. Serial No. 234,924.

*To all whom it may concern:*

Be it known that I, JOSEPH GRAMZA, a citizen of the United States of America, residing at Dunkirk, in the county of Chautauqua and State of New York, have invented certain new and useful Improvements in Wire-Cutting Devices, of which the following is a specification.

The primary object of the invention is the provision of a means for readily cutting wires such as those forming a barbed wire entanglement or barrier and adaptable for use upon such implements as knives without impairing the general usefulness thereof.

A further object of the invention is the provision of a wire cutter positioned upon a knife handle in compact arrangement and being entirely out of the way when locked in its closed inoperative position, the cutter being adapted for automatic opening when released ready for severing wires and similar articles.

In the drawings forming part of this application and in which like designating characters refer to corresponding parts throughout the several views, Figure 1 is a side elevation of a knife provided with my wire cutter, the same being illustrated by dotted lines in its closed position.

Fig. 3 is an enlarged central longitudinal sectional view of the same.

Fig. 4 is a view partly in elevation and partly in section of line IV—IV of Fig. 3, and Figs. 5, 6 and 7 are transverse sectional views taken upon lines V—V, VI—VI, and VII—VII respectively of Fig. 3.

Figure 1:
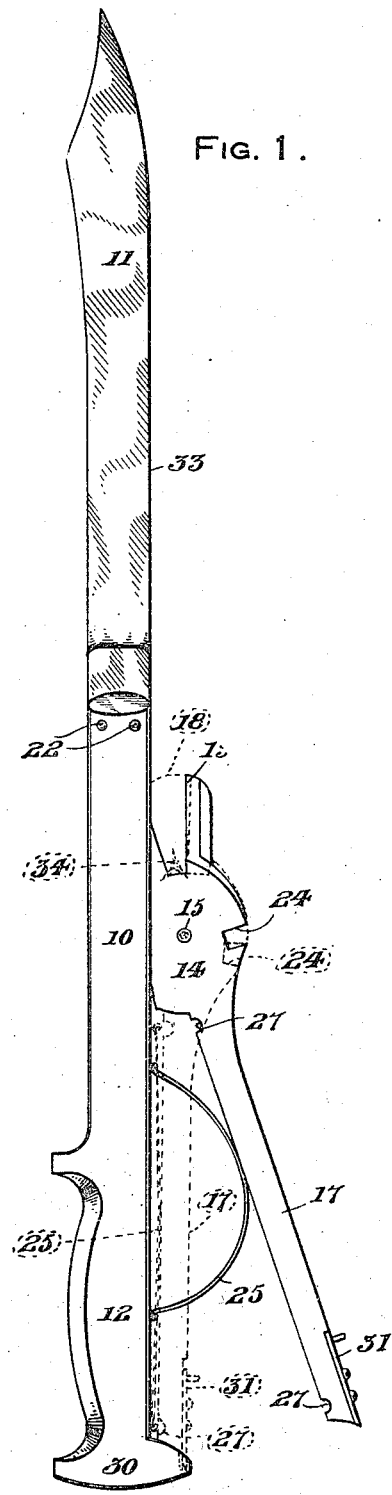
Figure 2:
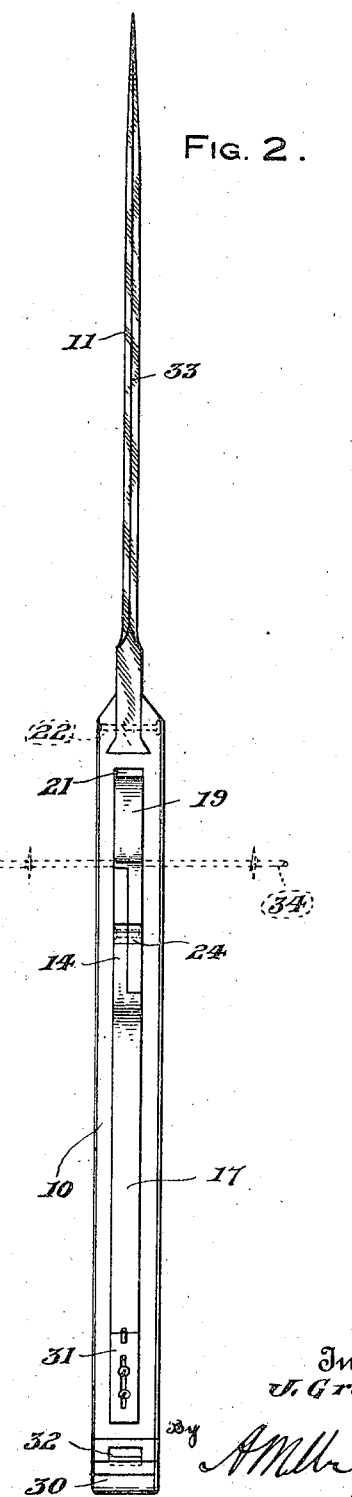
Fig. 2 is an elevational view from another side of the knife.

I have herein illustrated my wire cutter in connection with the handle 10 of a knife 11, a grip or hand portion 12 being provided at the free end of the handle. My wire cutter broadly consists of sections 13 and 14 pivotally connected together by a rivet 15 after the manner of the usual shears or cutting tongs. The section 13 has a handle extension 16 adapted to coöperate with a similar handle extension 17 of the section 14 while a cutting edge 18 is provided upon the section 14 for coöperating with a cutting jaw 19 upon the section 13.

A longitudinal groove 20 is provided in one side of the handle 10 terminating in an enlargement or recess 20 at a point adjacent the point of the attachment 22 of the knife blade 11. The cutter handle 16 is adapted for closely fitting within the groove 20 secured therein by screws 23 with the pivoted portions and jaws 18 and 19 of the cutter extending into the recess 21 within which the swinging jaw 18 is adapted to move during the cutting operation. Coöperating notches 24 are provided in the sections 13 and 14 adapted to receive a wire for shearing upon the relative movement of the sections 13 and 14.

A curved spring 25 is secured as at 26 to the shiftable handle 17 having beads 26' at its opposite ends for sliding upon the adjacent face of the stationary handle 16, the said beads 26' being adapted for reception within notches 27 of the handle 17 when the cutter sections are closed as indicated by dotted lines in Fig. 1 of the drawings. The curved end 28 of the handle 17 rests against the curved face 29 of the butt 30 of the handle 10 while the handle 17 is retained closed by means of a sliding bolt 31 upon the handle 17 adapted for positioning within a slot 32 in said aforementioned face 29. When the bolt 31 is released, the spring 25 automatically swings the handle 17 to its open position with the jaws 18 and 19 spaced apart ready for the reception of a wire such as 34. By pressing the handle 17 against the handle 16, the jaws 18 and 19 are brought together for severing the wire 34.

When the cutter is closed and retained by the bolt 31, it will be seen that the grip portion 12 and the handle 17 may be readily grasped for employing the knife 11 and at which times the blades 18 and 19 will be closed. When the blades 18 and 19 are open, the space therebetween will be substantially rearwardly of the sharpened longitudinal edge 33 of the knife 11 and whereby the wire may be readily positioned between the blades 18 and 19 to be severed upon closing the handles 16 and 17 together. A serviceable cutter is provided which is readily secured in the manner described upon the handle of any similar article such as a sword or rifle.

What I claim as new is:—

1. In combination with a knife handle having a longitudinal groove terminating in a large recess, a cutter including a pair of pivotally connected sections, one of said sections being secured within said groove, cutters upon said sections, one of the same adapted for shiftable movement within said recess, said handle having a notch in the butt end thereof, and a sliding retaining bolt upon one of the cutter sections adapted to seat within said notch for retaining the cutters closed whereby the hand of the operator may readily surround the said handle and cutter sections during the employment of the knife.

2. In combination with a knife handle having a longitudinal groove terminating in a large recess, a cutter including a pair of pivotally connected sections, one of said sections being secured within said groove, cutters upon said sections, one of the same adapted for shiftable movement within said recess, said handle having a notch in the butt end thereof, a sliding retaining bolt upon one of the cutter sections adapted to seat within said notch for retaining the cutters closed whereby the hand of the operator may readily surround said handle and cutter sections during the employment of the knife, one of said sections having spaced cut-away portions, and an opening spring for the cutter sections having terminal beads adapted for reception within said cut-away portions when the cutter is closed.

3. In combination with a knife having a handle provided with a grip portion having a butt at its free end; said handle having a longitudinal groove terminating in an enlarged recess adjacent the point of attachment of the knife thereto, said butt having a notch therein adjacent said groove, a pair of pivoted wire cutters having elongated handles, one of said handles being secured within said groove with the jaws of the cutter adjacent said recess, automatic opening means between said handles, and a sliding latch upon one handle of the cutters adapted for positioning within said notch whereby the handles of the wire cutter are retained closed adapted for grasping with said grip portion during the employment of the knife.

In testimony whereof I affix my signature.

JOSEPH GRAMZA.

Copies of this patent may be obtained for five cents each, by addressing the "Commissioner of Patents, Washington, D. C."